US008090210B2

(12) United States Patent
Zhou et al.

(10) Patent No.: US 8,090,210 B2
(45) Date of Patent: Jan. 3, 2012

(54) RECURSIVE 3D SUPER PRECISION METHOD FOR SMOOTHLY CHANGING AREA

(75) Inventors: Zhi Zhou, Corona, CA (US); Yeong-Taeg Kim, Irvine, CA (US); Ning Xu, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1375 days.

(21) Appl. No.: 11/394,954

(22) Filed: Mar. 30, 2006

(65) Prior Publication Data

US 2007/0236610 A1    Oct. 11, 2007

(51) Int. Cl.
G06K 9/40    (2006.01)

(52) U.S. Cl. ........ 382/260; 348/441; 348/607; 348/620; 348/699; 358/486; 382/166; 382/236; 382/240; 382/261

(58) Field of Classification Search .................... None
See application file for complete search history.

(56) References Cited

U.S. PATENT DOCUMENTS

| | | | | |
|---|---|---|---|---|
| 4,639,784 | A * | 1/1987 | Fling | 348/620 |
| 4,646,138 | A * | 2/1987 | Willis | 348/621 |
| 4,646,754 | A | 3/1987 | Seale | |
| 4,897,720 | A * | 1/1990 | Wu et al. | 348/412.1 |
| 5,218,649 | A | 6/1993 | Kundu et al. | |
| RE34,663 | E | 7/1994 | Seale | |
| 5,420,705 | A | 5/1995 | Ray | |
| 5,469,267 | A | 11/1995 | Wang | |
| 5,500,685 | A * | 3/1996 | Kokaram | 348/620 |
| 5,502,489 | A * | 3/1996 | Kim et al. | 348/607 |
| 5,502,510 | A * | 3/1996 | Kim et al. | 348/701 |
| 5,557,341 | A * | 9/1996 | Weiss et al. | 348/699 |
| 5,598,482 | A | 1/1997 | Balasubramanian et al. | |
| 5,734,744 | A | 3/1998 | Wittenstein et al. | |
| 5,801,657 | A | 9/1998 | Fowler et al. | |
| 5,802,218 | A | 9/1998 | Brailean | |
| 6,026,180 | A | 2/2000 | Wittenstein et al. | |
| 6,310,982 | B1 * | 10/2001 | Allred et al. | 382/260 |
| 6,457,032 | B1 | 9/2002 | Silver | |
| 6,591,015 | B1 * | 7/2003 | Yasunari et al. | 382/236 |
| 6,668,097 | B1 | 12/2003 | Hu et al. | |
| 6,724,942 | B1 | 4/2004 | Arai | |
| 6,862,372 | B2 | 3/2005 | Yang et al. | |
| 6,949,928 | B2 | 9/2005 | Ballester et al. | |
| 6,983,078 | B2 | 1/2006 | Baggs | |
| 7,003,174 | B2 | 2/2006 | Kryukov et al. | |
| 7,148,831 | B2 | 12/2006 | Krymski | |
| 7,190,380 | B2 | 3/2007 | Damera-Venkata et al. | |
| 7,203,234 | B1 | 4/2007 | Zeng | |
| 7,209,105 | B2 | 4/2007 | Elliott | |

(Continued)

OTHER PUBLICATIONS

U.S. Appl. No. 11/264,938, filed Nov. 1, 2005, N. Xu et al.

(Continued)

*Primary Examiner* — Anand Bhatnagar
*Assistant Examiner* — Tsung-Yin Tsai

(57) ABSTRACT

An image processing system implements recursive 3D super precision for processing smoothly changing video image areas by performing temporal noise reduction and then 2D super precision. The temporal noise reduction is applied to two frames, one being the current input low precision frame, and the other being the previous higher precision frame from memory. The 2D super precision is applied to the noise reduced frame to output a high precision frame which is also saved into memory for processing the next incoming frame. The input frame has a limited bit depth while the output image has an increased bit depth.

2 Claims, 5 Drawing Sheets

U.S. PATENT DOCUMENTS

| | | | |
|---|---|---|---|
| 7,218,418 | B2 | 5/2007 | Curry et al. |
| 7,330,596 | B2 * | 2/2008 | Suino et al. .................. 382/240 |
| 7,375,760 | B2 * | 5/2008 | Kempf et al. ................. 348/441 |
| 7,420,570 | B2 | 9/2008 | Xu et al. |
| 7,541,963 | B2 | 6/2009 | Krymski |
| 7,551,795 | B2 | 6/2009 | Xu et al. |
| 7,554,555 | B2 | 6/2009 | Daly et al. |
| 7,724,307 | B2 * | 5/2010 | Wan et al. .................... 348/620 |
| 7,734,088 | B2 * | 6/2010 | Bhattacharjya et al. ...... 382/166 |
| 2002/0141499 | A1 * | 10/2002 | Goertzen ................. 375/240.12 |
| 2003/0156301 | A1 * | 8/2003 | Kempf et al. ................. 358/486 |
| 2003/0179945 | A1 | 9/2003 | Akahori |
| 2005/0280739 | A1 * | 12/2005 | Lin et al. ...................... 348/607 |
| 2006/0018559 | A1 | 1/2006 | Kim et al. |
| 2006/0104535 | A1 | 5/2006 | Varekamp |
| 2006/0139494 | A1 * | 6/2006 | Zhou et al. .................... 348/607 |
| 2007/0140582 | A1 * | 6/2007 | Chen et al. .................... 382/261 |
| 2008/0118170 | A1 | 5/2008 | Zhou et al. |
| 2008/0175474 | A1 | 7/2008 | Zhou et al. |

OTHER PUBLICATIONS

Bayer, B.E., An Optimum Method for Two-Level Rendition of Continuous-Tone Pictures, Proceedings of the International Conference on Communications, 1973, pp. 26-11-26-15, USA.

Ulichney, R.A., Dithering with Blue Noise, Proceedings of IEEE, vol. 76, No. 1, IEEE, Jan. 1988, pp. 56-79, USA.

Atkins, C. et al., Model-Based Color Image Sequence Quantization, Proceedings of SPIE/SI&T Conference on Human Vision, Visual Processing, and Digital Display, vol. 2179, San Jose, CA, Feb. 1994, pp. 310-317, USA.

Mulligan, J., Methods for Spatiotemporal Dithering, SID 93 Digest, 1993, pp. 155-158, USA.

Adler, R.L. et al., The Mathematics of Halftoning, IBM Journal of Research and Development, vol. 47, No. 1, IBM, Jan. 2003, pp. 5-15, USA.

Damera-Venkata, N. et al., Design and Analysis of Vector Color Error Diffusion Halftoning Systems, IEEE Transactions on Image Processing, vol. 10, No. 10, Oct. 2001, pp. 1552-1565, USA.

Ostromoukhov, V., A Simple and Efficient Error-Diffusion Algorithm, Proceedings of the 28th Annual Conference on Computer Graphics and Interactive Techniques, ACM, 2001, pp. 567-572, USA.

Floyd, R.W. et al., An Adaptive Algorithm for Spatial Greyscale, Proceedings of Society for Information Display, vol. 17, No. 2, 1976, pp. 75-77, USA.

Ulichney, R., Digital Halftoning, The MIT Press, 1987, pp. 1-8, Cambridge, MA, USA.

Jarvis, J.F. et al., A Survey of Techniques for the Display of Continuous Tone Pictures on Bilevel Displays, Computer Graphics and Image Processing, vol. 5, Academic Press, Inc., 1976, pp. 13-40, USA.

U.S. Non-Final Office Action for U.S. Appl. No. 11/106,812 mailed Jul. 24, 2007.

U.S. Non-Final Office Action for U.S. Appl. No. 11/264,938 mailed Jan. 7, 2009.

U.S. Notice of Allowance for U.S. Appl. No. 11/264,938 mailed Apr. 17, 2009.

U.S. Non-Final Office Action for U.S. Appl. No. 11/264,973 mailed May 13, 2008.

U.S. Final Office Action for U.S. Appl. No. 11/264,973 mailed Dec. 3, 2008.

U.S. Notice of Allowance for U.S. Appl. No. 11/264,973 mailed Feb. 20, 2009.

U.S. Non-Final Office Action for U.S. Appl. No. 11/603,466 mailed Mar. 9, 2010.

U.S. Notice of Allowance for U.S. Appl. No. 11/603,466 mailed Jun. 24, 2010.

U.S. Notice of Allowance for U.S. Appl. No. 11/603,466 mailed Jul. 9, 2010.

U.S. Non-Final Office Action for U.S. Appl. No. 11/655,321 mailed Apr. 1, 2010.

U.S. Final Office Action for U.S. Appl. No. 11/655,321 mailed Sep. 7, 2010.

* cited by examiner

RECURSIVE 3D SUPER PRECISION METHOD FOR SMOOTHLY CHANGING AREA

FIELD OF THE INVENTION

The present invention relates generally to video and image processing, and more to improving the video content precision for smoothly changing areas.

BACKGROUND OF THE INVENTION

Videos and images may contain smoothly changing areas such as blue-sky background and shadings on the wall. In these areas, the luminance is changing gradually, which should be perceived as smooth areas. However, as video and images are stored digitally and the bit depth is limited, stage-like false contour artifacts are perceived in these areas.

To eliminate such artifacts, a higher precision content of the smoothly changing area is needed. Once the higher precision content is obtained, the content can be displayed on a higher bit depth display such that the steps between two consecutive luminance levels are too small to be perceived.

Alternatively, half-toning technique can be used (e.g., super dithering) to quantize the higher precision content to the display bit depth and remove the perceptual artifacts due to the spatial averaging characteristics of human visual system.

In either case, obtaining a higher precision content for the smoothly changing area is an essential step to removing these perceptional artifacts.

BRIEF SUMMARY OF THE INVENTION

In one embodiment the present invention provides an image processing method implementing recursive 3D super precision for processing smoothly changing areas. Such image processing method includes two primary steps: temporal noise reduction and 2D super precision.

The temporal noise reduction is applied to two frames: one being the current input low precision frame, and the other being the previous higher precision frame from memory. The temporal noise reduction is applied on the current low precision frame in temporal domain to output a noise reduced frame. The 2D super precision is applied on the noise reduced frame to output a high precision frame which is also saved into memory for processing the next incoming frame. In this case, the input frame has a limited bit depth while the output image has an increased bit depth.

In another aspect, the present invention provides a system (apparatus) that implements the above methods of the present invention. Other embodiments, features and advantages of the present invention will be apparent from the following specification taken in conjunction with the following drawings.

DETAILED DESCRIPTION OF THE INVENTION

In one embodiment, the present invention provides a three-dimensional (3D) recursive super precision method and system, for processing smoothly changing areas. Such image processing includes two primary processes: temporal noise reduction and 2D super precision.

The temporal noise reduction process is applied to two frames: one being the current input low precision frame, and the other being the previous higher precision frame from memory. The 2D super precision process is applied to the noise reduced frame to output a high precision frame which is also saved into memory for processing the next incoming frame. In this case, the input frame has a limited bit depth while the output image has an increased bit depth.

Commonly assigned U.S. patent application titled "Super Precision For Smoothly Changing Area Based on Segmentation and Low-pass Filtering", Ser. No. 11/264,938, filed on Nov. 1, 2005 (incorporated herein by reference), provides an example two-dimensional (2D) super precision algorithm which first segments out the smoothly changing area and then computes a higher precision content based on the segmented local support for each pixel within the smoothly changing area.

A preferred embodiment of the present invention described herein combines a temporal noise reduction algorithm and said example 2D super precision algorithm into a 3D recursive super precision algorithm which achieves much higher precision. Other embodiments are possible, and the present invention is not limited to example implementations described herein.

Figure 1:
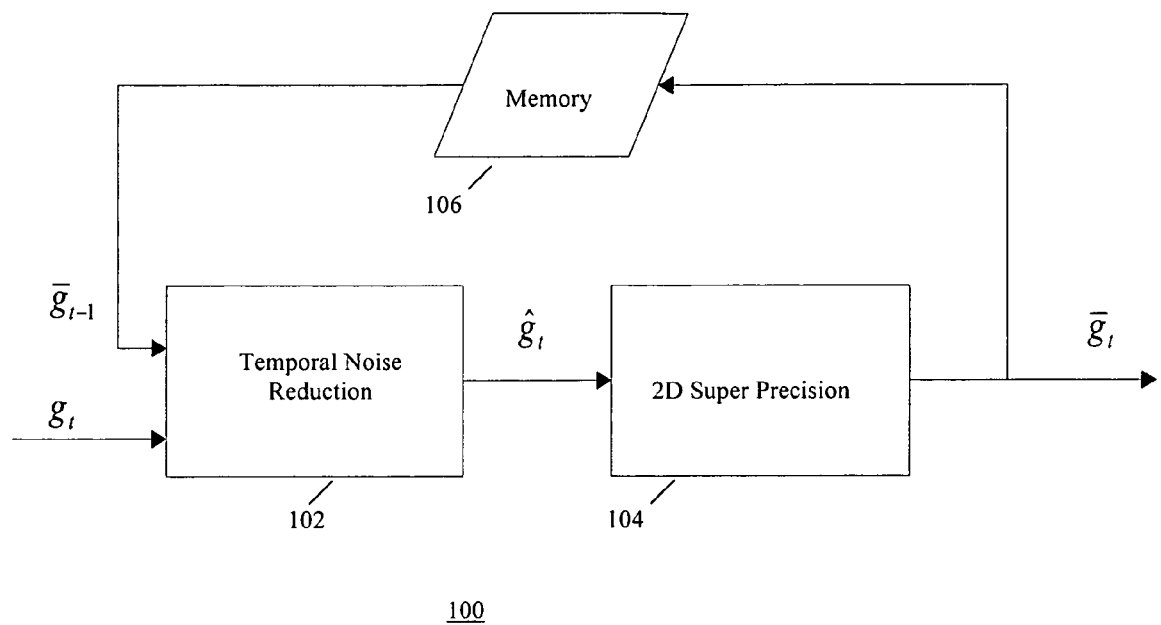
FIG. 1 shows a functional block diagram of an example 3D recursive Super Precision System, according to an embodiment of the present invention.

FIG. 1 shows an example block diagram of an embodiment of a 3D recursive Super Precision System 100, according to an embodiment of the present invention. As shown in FIG. 1, the 3D recursive super precision system 100 implements two primary processing steps: temporal noise reduction in the noise reduction unit 102, and 2D super precision processing in the processing unit 104. Memory 106 saves the output of the 2D super precision unit 104 and provides a frame delay.

Without loss of generality, let $g_t$ denote the incoming video frame at time instant t and $g_t(i,j)$ denote the corresponding pixel value at the Cartesian coordinates (i,j) where i represents the ordinate and j represents the abscissa. Let $\hat{g}_t$ (noise reduced frame) denote the output of the temporal noise reduction unit 102 and $\bar{g}_t$ denote the output of the 2D super precision unit 104. At the same time, $\bar{g}_t$ is also the output of the entire 3D recursive super precision unit 100.

Figure 2:
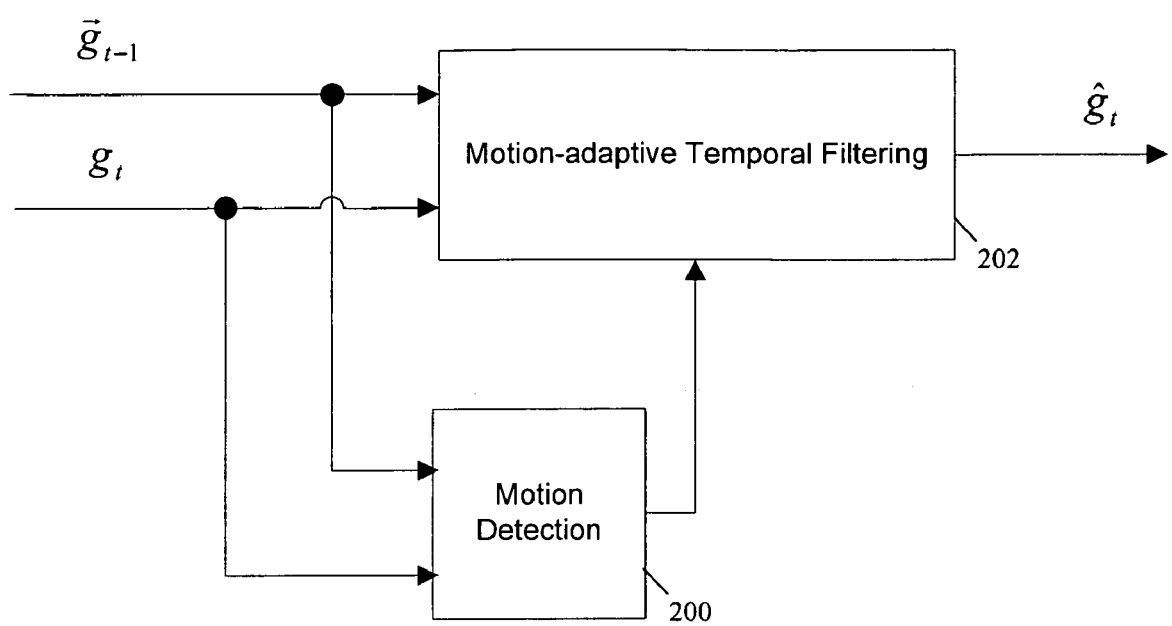
FIG. 2 shows an example block diagram of an embodiment of the temporal noise reduction unit of FIG. 1.

FIG. 2 shows an example block diagram of an embodiment of the temporal noise reduction unit 102. The temporal noise reduction unit 102 includes a motion detector 200 which detects motion between the current frame $g_t$ and the output $\bar{g}_{t-1}$ of its previous frame. The noise reduction unit 102 further includes a motion-adaptive temporal filter 202 which outputs the noise-reduced frame $\hat{g}_t$ from the input frames $g_t$ and $\bar{g}_{t-1}$.

Accordingly, the temporal noise reduction unit 102 filters the current frame $g_t$ based on a motion detection between frames $g_t$ and $\bar{g}_{t-1}$. Commonly assigned U.S. patent application titled "A method of temporal noise reduction in video sequences", Ser. No. 11/025,173, filed on Dec. 29, 2004

(incorporated herein by reference), provides an example temporal noise reduction method to obtain $\hat{g}_t$, which is implemented in the example temporal noise reduction unit 102 of FIG. 1. An arbitrary pixel $\hat{g}_t(i,j)$ is obtained by recursive motion-adaptive temporal filtering on the pixel $g_t(i,j)$ according to example relation (1) below:

$$\hat{w}_{t-1}(i, j) = F(w_{t-1}(i, j)),$$
$$\hat{g}_t(i, j) = \frac{\hat{w}_{t-1}(i, j)\hat{g}_{t-1}(i, j) + g_t(i, j)}{\hat{w}_{t-1}(i, j) + 1},$$
$$w_t(i, j) = \hat{w}_{t-1}(i, j) + 1.$$
(1)

wherein the variable $w_t(i,j)$ represents the motion-adaptive weight of the previous filtered pixel $\hat{g}_{t-1}(i,j)$ in the above filtering, and has initial value 0. The motion-adaptive weight $\hat{w}_{t-1}(i,j)$ is a monotonically decreasing function of the motion between the pixels $\hat{g}_{t-1}(i,j)$ and $g_t(i,j)$, denoted as $F(\cdot)$ in relation (1) above.

The motion information is obtained by applying motion detection such as mean absolution error between local windows of $\hat{g}_{t-1}(i,j)$ and $g_t(i,j)$. If the error is smaller than a threshold, we say there is no motion, otherwise, we say there is motion. If there is no motion, then $\hat{w}_{t-1}(i,j)=w_{t-1}(i,j)$ If there is motion, then $\hat{w}_{t-1}(i,j)=0$. For a soft-switching motion level, the value $\hat{w}_{t-1}(i,j)$ can be either linear or non-linear interpolated.

Figure 3:
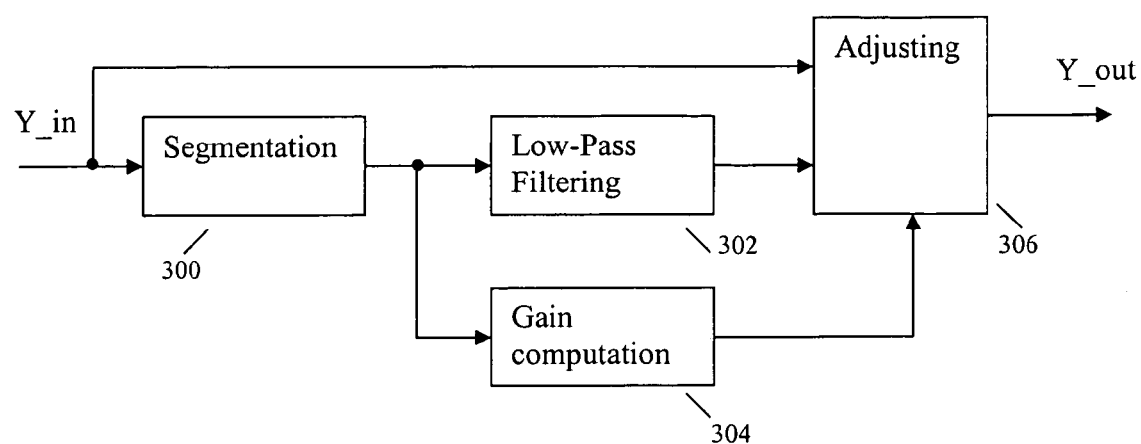
FIG. 3 shows an example block diagram of an embodiment of 2D super precision unit of FIG. 1.

FIG. 3 shows an example block diagram of an embodiment of 2D super precision unit 104, including a segmentation unit 300, a low pass filter 302, a gain computation unit 304 and an adjustment unit 306. The 2D super precision unit 104 filters the noise reduced frame $\hat{g}_t$ in the spatial domain an output frame $\bar{g}_t$. The aforementioned commonly assigned U.S. patent application titled "Super Precision For Smoothly Changing Area Based on Segmentation and Low-pass Filtering", Ser. No. 11/264,938, filed Nov. 1, 2005, (incorporated herein by reference), provides an example 2D super precision processing method to obtain frame $\bar{g}_t$, which is implemented in the example 2D super precision unit 104 of FIG. 1.

A segmentation step determines where the smoothly changing area is, and a low-pass filtering step is used to obtain the higher precision luminance values. As such, the segmentation unit 300 (FIG. 3) segments the frame $\hat{g}_t$ into different connected parts based on selected criteria and then the low pass filter 302 performs low pass filtering on each pixel's local support based on the segmentation result. The gain computation unit 304 computes the gain of low-pass filtering to adjust the final output using the adjustment unit 306. The input frame $\hat{g}_t$ (i.e., frame Y_in) has a limited bit depth while the output frame $\bar{g}_t$ (i.e., frame Y_out) has an increased bit depth. The output frame $\bar{g}_t$ is saved into memory 106 for processing the next incoming frame.

Figure 4:
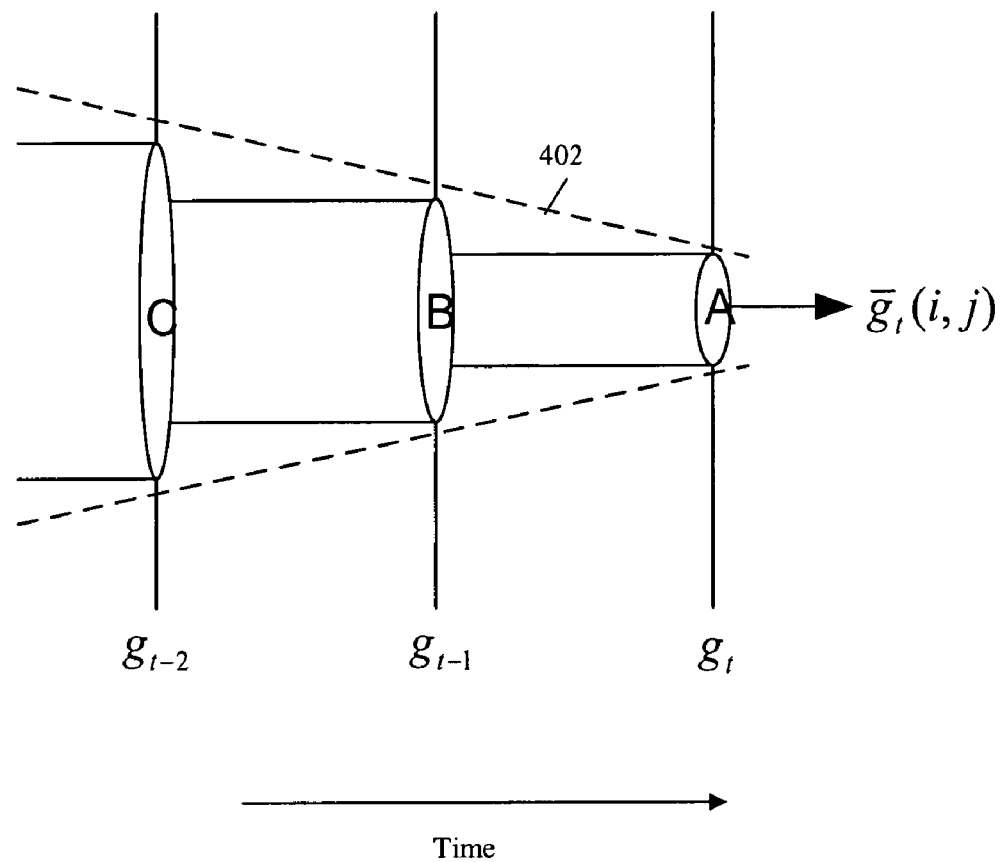
FIG. 4 shows an example of applying the 3D recursive super precision algorithm to smoothly-changing and no-motion area in a video sequence, according to an embodiment of the present invention.

The 3D recursive super precision method according to the present invention provides high precision pixels in the smoothly-changing and no-motion area. FIG. 4 shows an example of applying the 3D recursive super precision system 100 to smoothly-changing and no-motion area in a video sequence, according to an embodiment of the present invention.

Referring to the time sequential example 400 in FIG. 4, assume there is no motion between the incoming frames. The pixel $\bar{g}_t(i,j)$ is obtained by applying the 2D super precision process in unit 102 to the local area A of frame $\hat{g}_t$. The pixels in the area A of frame $\hat{g}_t$ are obtained from a temporal filtering of the area A between frames $g_t$ and $\bar{g}_{t-1}$, while the pixels in the area A of frame $\bar{g}_{t-1}$, are obtained by applying the 2D super precision unit 104 to a larger local area B in frame $\hat{g}_{t-1}$. The inventors have found that, always a larger area in the previous frame contributes to filter a smaller area in the current frame. Equivalently, all the pixels between the dotted line 402 contribute to obtain the filtering result frame $\bar{g}_t(i,j)$. In temporal direction, the dotted line 402 can go back to many previous frames with the condition of no motion. Spatially, the dotted line 402 can expend within smoothly changing area. Thus, much higher precision output can be obtained.

Figure 5:
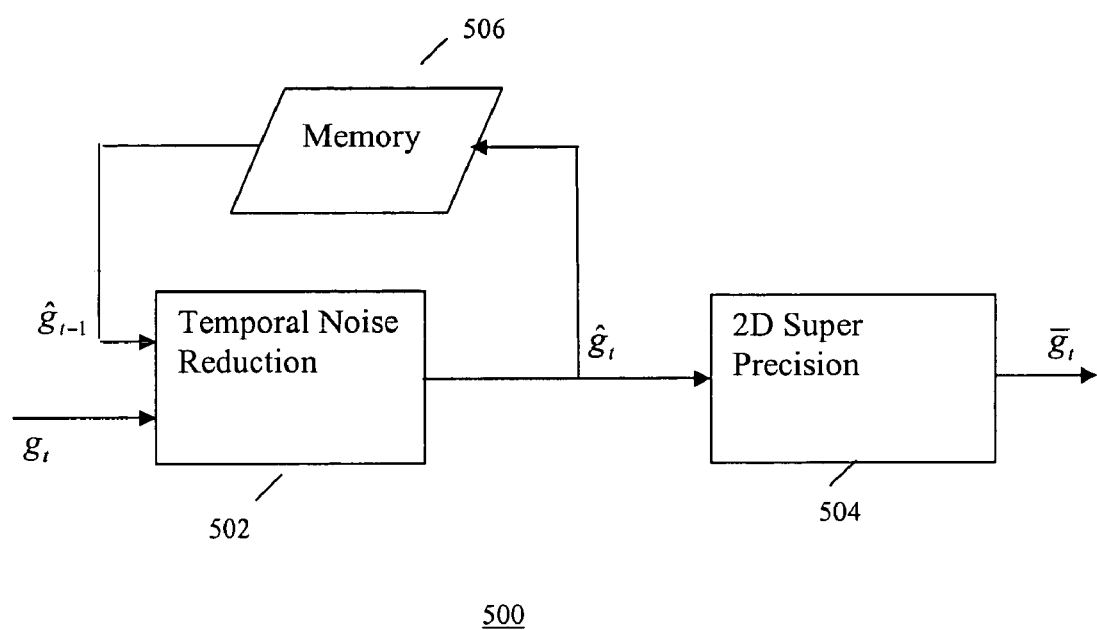
FIG. 5 shows an embodiment of recursive 3D super precision method for smoothly changing area, according to an embodiment of the present invention.

FIG. 5 shows another embodiment of recursive 3D super precision method implemented in example system 500 for smoothly changing area, according to the present invention. In this example, temporal noise reduction unit 502, 2D super precision unit 504 and memory 506 can be similar to the temporal noise reduction unit 102, the 2D super precision unit 104 and the memory 106, respectively, in FIG. 1. The only difference is that in system 500 of FIG. 5, the memory unit 506 stores the result of the temporal noise reduction unit 502 ($\hat{g}_t$) and delays one frame ($\hat{g}_{t-1}$) before sending back to the temporal noise reduction unit 502 for processing in conjunction with next input frame ($g_t$).

While the present invention is susceptible of embodiments in many different forms, there are shown in the drawings and herein described in detail, preferred embodiments of the invention with the understanding that this description is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:
1. A method for digital image processing, comprising the steps of:
   performing temporal noise reduction on an input digital image frame to generate a noise reduced frame; and
   performing 2D super precision processing on the noise reduced frame to obtain an output image having higher precision pixels than the input image;
   wherein the steps of performing temporal noise reduction further includes the steps of reducing noise in a sequence of input digital image frames, by:
   (a) reducing noise in a current noisy frame by performing motion-adaptive temporal noise reduction based on the current noisy frame and a previous noise-reduced frame; and
   (b) saving the current noise-reduced frame into memory for filtering the next frame in the sequence; and
   repeating steps (a) and (b) for the next video frame in the sequence;
   wherein step (a) further includes the steps of:
   detecting motion between the current noisy frame and the previous noise-reduced frame to generate motion information; and
   performing temporal filtering on the current noisy frame as a function of the motion information;

wherein the step of detecting motion further includes the steps of performing pixel-wise motion detection between the current noisy frame and the previous noise-reduced frame;

wherein the step of detecting motion further includes the steps of performing pixel-wise motion detection in a local window in the current noisy frame relative to a corresponding local window in the previous noise-reduced frame; and wherein the step of performing temporal filtering further includes the steps of:

if motion is not detected for a pixel in the current noisy frame, performing temporal filtering for the pixel along the temporal axis using a maximum likelihood estimated process such that performing 2D super precision processing on the noise reduced frame thereby obtains an output image having higher precision pixels in the smoothly-changing and no-motion areas than the input; and if motion is detected for a pixel in the current noisy frame, maintaining the pixel characteristics to avoid motion blurring.

2. A method for digital image processing, comprising the steps of:

performing temporal noise reduction on an input digital image frame to generate a noise reduced frame; and performing 2D super precision processing on the noise reduced frame to obtain an output image having higher precision pixels than the input image;

wherein the steps of performing 2D super precision processing, further comprises the steps of:

segmenting the noise reduced image frame into different segments of pixels; and applying low-pass filtering to pixels in a segment to obtain a higher precision image;

wherein the steps of segmenting the reduced image frame into different segments further includes the step of:

segmenting a local window in the reduced image frame, wherein the local window is centered at a selected pixel; and adjusting the segment to generate an adjusted segment that is symmetric about the selected pixel;

thereby obtaining an output image having higher precision pixels in smoothly-changing and no-motion areas than the input;

wherein the step of segmenting the reduced image frame further includes the steps of determining the pixels for each segment based on the luminance value of each pixel;

wherein the step of segmenting the reduced image frame further includes the steps of determining the pixels for each segment by computing the difference in luminance of a pixel and that of its neighboring pixels to determine the pixels for the same segment;

wherein the step of applying low-pass filtering to a segment to obtain a higher precision image further includes the steps of performing averaging of luminance values of the pixels in the local symmetric segment, to generate the higher precision image;

wherein the step of applying low-pass filtering to a segment to obtain a higher precision image further includes the steps of performing averaging of luminance values of the pixels in a segment, to generate the higher precision image;

wherein the step of applying low-pass filtering to the segment to obtain a higher precision image further includes the steps of:

performing low-pass filtering on the segment pixels to obtain a higher precision value for the luminance value of each pixel; and limiting the difference between luminance values of the pixels in the input image and pixels in the higher precision image; and wherein the step of limiting the differences between luminance values of the pixels in the reduced image frame and pixels in the higher precision image further includes the steps of ensuring that while truncating the pixel luminance values in the higher precision image to the original precision, the result is the same as the luminance value of the pixels of the input image.

* * * * *